(12) United States Patent
Mitani (10) Patent No.: US 6,466,233 B1
(45) Date of Patent: Oct. 15, 2002

(54) INFORMATION PROCESSING UNIT FOR CONTROLLING A PLURALITY OF ELECTRONIC DEVICES AND METHOD THEREOF, AND PROVISION MEDIUM ASSOCIATED THEREWITH

(75) Inventor: Hitoshi Mitani, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/443,808

(22) Filed: Nov. 19, 1999

(30) Foreign Application Priority Data

Nov. 20, 1998 (JP) .......................................... 10-330576
Jan. 29, 1999 (JP) .......................................... 11-021792

(51) Int. Cl.[7] ............................................... G06F 17/00
(52) U.S. Cl. ....................................... 345/716; 345/723
(58) Field of Search ................................ 345/700, 716, 345/723, 848, 853, 854; 348/2, 6, 8, 10, 12

(56) References Cited

U.S. PATENT DOCUMENTS

| | | | | |
|---|---|---|---|---|
| 5,617,565 A | * | 4/1997 | Augrenbaum | ................. 707/10 |
| 5,818,935 A | * | 10/1998 | Maa | ............................ 348/461 |
| 6,321,091 B1 | * | 11/2001 | Holland | ........................ 455/456 |

* cited by examiner

Primary Examiner—Cao H. Nguyen
(74) Attorney, Agent, or Firm—Frommer Lawrence & Haug LLP; William S. Frommer (57) ABSTRACT

An information processing unit controls a plurality of electronic devices. The information processing unit includes a storage unit for storing input graphical-user-interface data on the electronic devices, a display unit for displaying graphical user interfaces corresponding to the graphical-user-interface data stored in the storage unit, a detecting unit for detecting user operations corresponding to the graphical user interfaces displayed on the display unit, and a transmitting unit for transmitting control signals controlling the electronic devices in accordance with the results of detection by the detecting unit.

15 Claims, 9 Drawing Sheets

INFORMATION PROCESSING UNIT FOR CONTROLLING A PLURALITY OF ELECTRONIC DEVICES AND METHOD THEREOF, AND PROVISION MEDIUM ASSOCIATED THEREWITH

BACKGROUND OF THE INVENTION

1. Field of the Invention

The present invention relates to information processing units, information processing methods, and to provision media therewith, and in particular, relates to an information processing unit and method for outputting operation commands to different types of electronic devices, and to a medium containing the method for the information processing unit.

2. Description of the Related Art

In the case where a video cassette recorder (VCR) is connected to a television (TV) receiver, a remote controller dedicated to the VCR and a remote controller dedicated to the TV receiver are used. When there are different remote controller for electronic devices, as described above, a user may be confused by forgetting the correspondence between the remote controllers and the electronic devices. In addition, for controlling a series of processes by a plurality of electronic devices as in the case where a satellite-broadcasted program, received by a set top box (STB), is recorded by a VCR while being monitored by a TV receiver, different remote controllers for the electronic devices must be used.

Accordingly, a multifunctional remote controller has been developed that can operate a plurality of electronic devices by using recorded operation commands for the electronic devices.

Although the multifunctional remote controller can control electronic devices recorded in the remote controller, it cannot control a newly acquired electronic device, i.e., an electronic device for which controller information has not yet been recorded. To solve this problem, a remote controller provided with a learning function, by which an operable electronic device can be additionally recorded in the remote controller, has been further developed.

In the case where the remote controller uses its learning function to learn operation commands for the added electronic device, one of the existing buttons of the remote controller must be assigned to the added electronic device. This causes a problem in that confusion may occur because the original markings for the button of the remote controller do not correspond to the added electronic device.

SUMMARY OF THE INVENTION

Accordingly, it is an object of the present invention to provide an information processing unit and method that output operation commands to a plurality of electronic devices without confusing user operations by displaying graphical user interfaces (GUIs) supplied from the electronic devices in the form of hypertext markup language (HTML), and to provide a medium providing the information processing method for the information processing unit.

To this end, according to an aspect of the present invention, the foregoing object is achieved through provision of an information processing unit for controlling a plurality of electronic devices. The information processing unit includes a storage unit for storing input graphical-user-interface data for the electronic devices, a display unit for displaying graphical user interfaces corresponding to the graphical-user-interface data stored in the storage unit, a detecting unit for detecting user operations corresponding to the graphical user interfaces displayed on the display unit, and a transmitting unit for transmitting control signals controlling the electronic devices in accordance with the results of detection by the detecting unit.

Preferably, the graphical-user-interface data are described in the form of hypertext markup language. The shapes and arrangement of symbols on each graphical user interface may be similar to those of operation buttons of a remote controller dedicated to the corresponding electronic device.

According to another aspect of the present invention, the foregoing object is achieved through provision of a remote controller for controlling a plurality of electronic devices. The remote controller includes a storage unit for storing externally input graphical-user-interface data on the electronic devices, the graphical-user-interface data being described in the form of hypertext markup language, a display for displaying graphical user interfaces corresponding to the graphical-user-interface data stored in the storage unit, a detector for detecting user operations corresponding to the graphical-user-interface data displayed on the display, and a transmitter for transmitting control signals controlling each electronic device in response to the result of detection by the detector.

Preferably, the graphical-user-interface data include command codes for controlling the electronic devices, and the command codes correspond to control buttons displayed as the graphical user interfaces, and command data are read from the storage unit by operating each control button so that each electronic device is controlled.

The graphical-user-interface data may be stored in the electronic devices, and the graphical-user-interface data may be supplied from the electronic devices to the storage unit.

The electronic devices may store addresses at which the graphical-user-interface data are stored, and the graphical-user-interface data may be supplied from an information processing unit corresponding to each address to the storage unit.

The graphical-user-interface data may be stored in a storage medium provided separately from the electronic devices, and the graphical-user-interface data may be supplied from the storage medium to the storage unit.

According to a further aspect of the present invention, the foregoing object is achieved through provision of an information processing method for controlling a plurality of electronic devices. The information processing method includes a storage step for storing input graphical-user-interface data on the electronic devices, a display step for displaying graphical user interfaces corresponding to the graphical-user-interface data stored in the storage step, a detection step for detecting user operations corresponding to the graphical user interfaces displayed in the display step, and a transmission step for transmitting control signals controlling the electronic devices in accordance with the results of detection performed in the detection step.

Preferably, the information processing method further includes a selection step for selecting one electronic device for supplying the graphical-user-interface data, and a record step for instructing the transmission of the graphical-user-interface data from the selected electronic device.

The information processing method may further include a selection step for selecting one electronic device for supplying the graphical-user-interface data, and a download step for downloading the graphical-user-interface data, based on the address of a graphical-user-interface-data storage server at which the graphical user interface data are stored. The address of the graphical-user-interface-data storage server is output from the selected electronic device.

According to a still further aspect of the present invention, the foregoing object is achieved through provision of a provision medium for providing a computer-readable program to an information processing unit for controlling a plurality of electronic devices. The computer-readable program controls the information processing unit to execute a process including a storage step for storing input graphical-user-interface data on the electronic devices, a display step for displaying graphical user interfaces corresponding to the graphical-user-interface data stored in the storage step, a detection step for detecting user operations corresponding to the graphical user interfaces displayed in the display step, and a transmission step for transmitting control signals controlling the electronic devices in accordance with the results of detection performed in the detection step.

According to yet another aspect of the present invention, the foregoing object is achieved through provision of an electronic device control method for controlling an electronic device controlled by an information processing unit. In the electronic device control method, when the electronic device receives from the information processing unit a request for transmitting graphical-user-interface data, and the graphical-user-interface data are stored in the electronic device or a storage medium belonging thereto, the method controls the electronic device to transmit the graphical-user-interface data to the information processing unit, and in the electronic device control method, when the graphical-user-interface data are not stored in the electronic device or the storage medium, the method controls the electronic device to output an address stored in the electronic device, which represents a server storing the graphical-user-interface data, and the method controls the electronic device downloads, from the server corresponding to the address via a network, and supplies the graphical-user-interface data to the information processing unit.

Preferably, the graphical-user-interface data are described in the form of hypertext markup language, and the address is an Internet protocol address.

DESCRIPTION OF THE PREFERRED EMBODIMENTS

Figure 1:
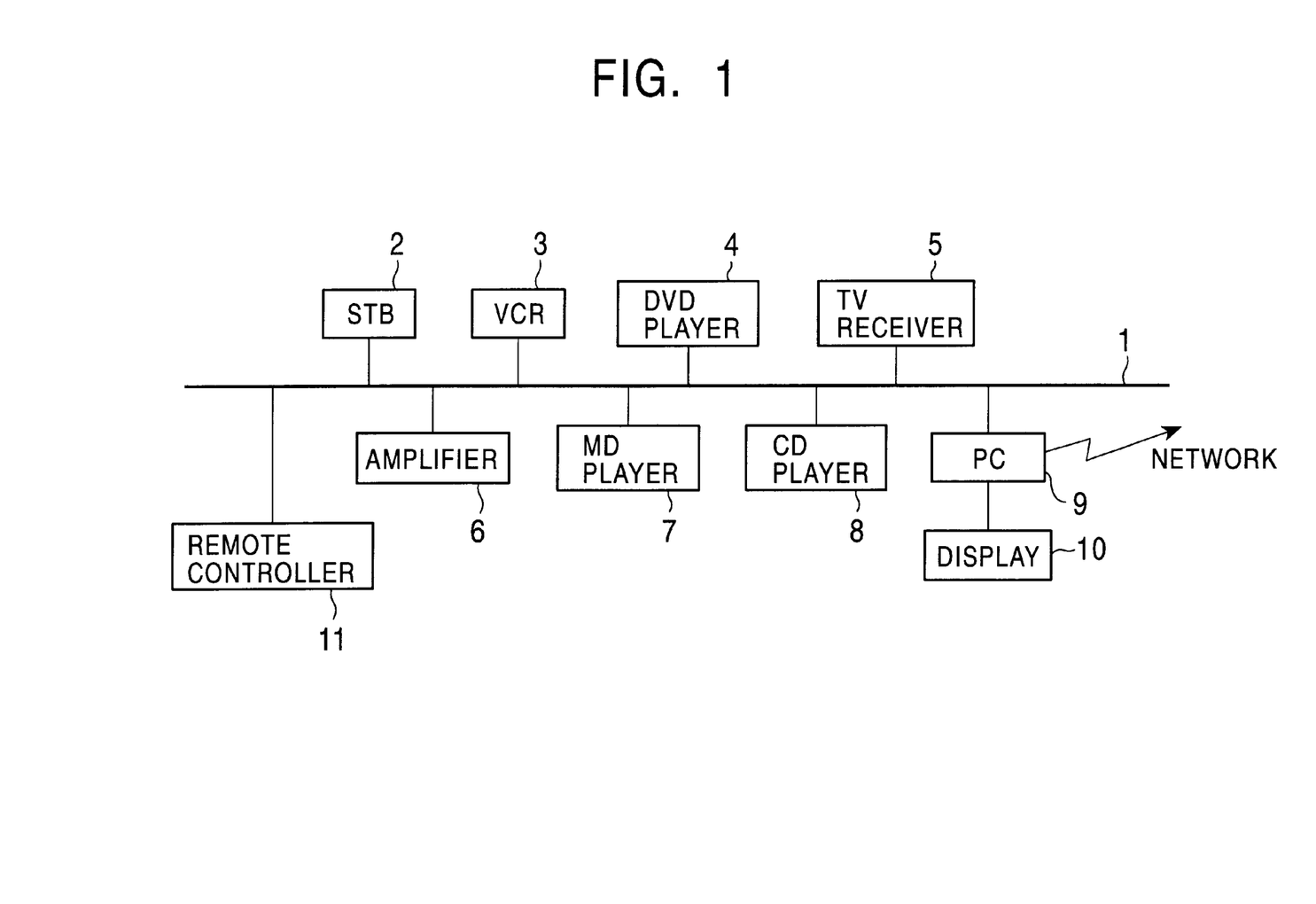
FIG. 1 is a block diagram showing the link of a remote controller 11 according to an embodiment of the present invention to other electronic devices.

FIG. 1 shows an example of the connection between a remote controller 11 according to an embodiment of the present invention and other electronic devices. An STB 2, a VCR 3, a digital versatile disk (DVD) player 4, a TV receiver 5, an amplifier 6, a MiniDisk (MD) player 7, a compact disk (CD) player 8, and a personal computer (PC) 9 are connected to the remote controller 11 via a bus 1.

Each of the STB 2 to the PC 9 stores GUI data described in its HTML or the Internet protocol (IP) address of a server (on a network) at which GUI data described in its HTML are stored. In response to a request from the remote controller 11, each of the STB 2 to the PC 9 supplies the remote controller 11 with the stored HTML-form GUI data, or supplies the PC 9 with the IP address of the server.

The HTML-form GUI data include control codes controlling electronic devices.

The PC 9 is connected to a display 10, and also to a network (not shown) such as the Internet.

The type of the bus 1 may include an IEEE (Institute of Electrical and Electronic Engineers) 1394 cable or another type of cable, an infrared link, and a radio link. By using one of these or a plurality of types of links among these, all the electronic devices may be connected. In the following description, the remote controller 11 is connected to the other electronic devices by using the infrared link. In addition, in the case where an IEEE 1394 cable is used to exchange various data such as HTML data or GUI data (described below), by embedding the data in a known IP packet processed by a PC, and embedding the IP packet (e.g., asynchronous packet) in a packet defined in the IEEE 1394, data exchange can be performed. Definitely, also in the case where not only the IEEE 1394 but also another type of data transfer format is used, data exchange can be performed such that a packet defined in the format is used, and each device performing data exchange embeds the desired data in the packet when transmitting the packet and extracts the desired data included in the received packet when receiving the packet.

Figure 2:
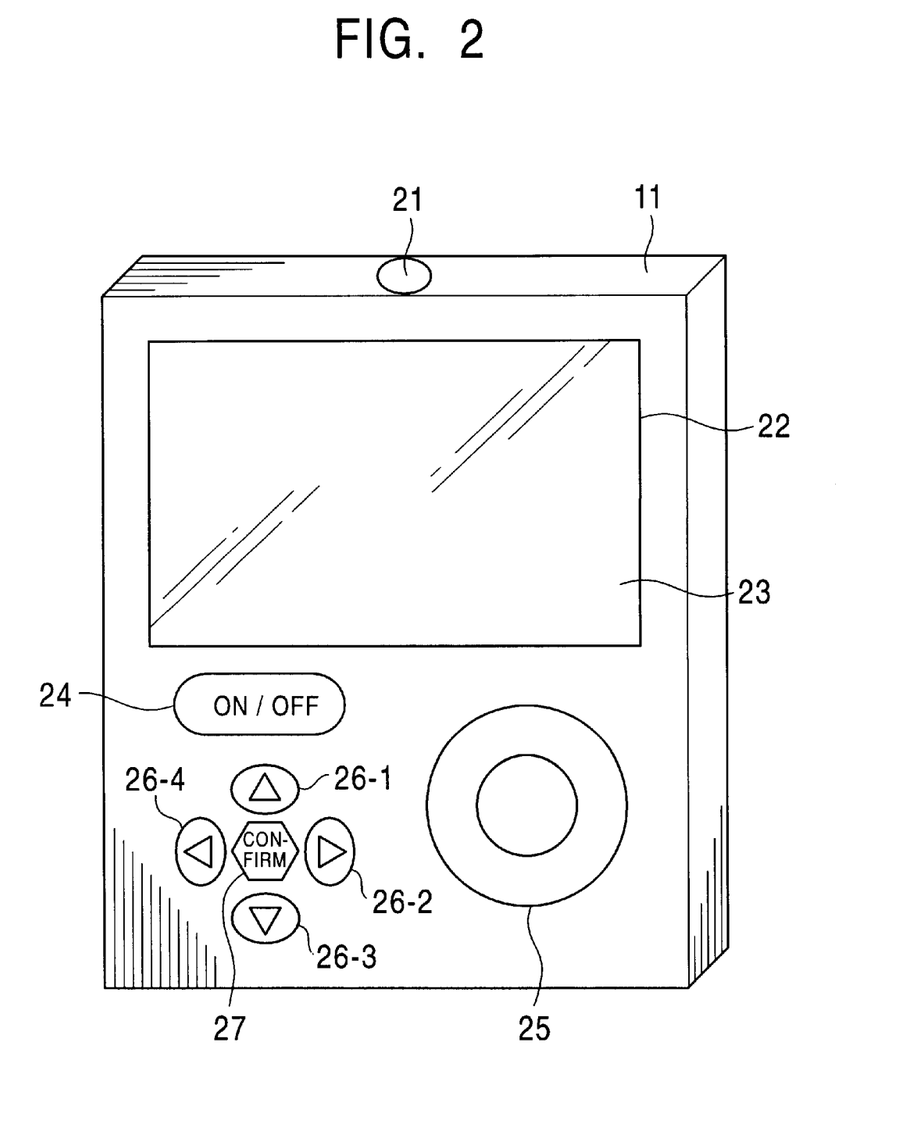
FIG. 2 is a perspective view showing the exterior of the remote controller 11 shown in FIG. 1.

FIG. 2 shows the exterior of the remote controller 11. An infrared transmitting/receiving unit 21 receives HTML-form GUI data supplied as an infrared signal from one of the STB 2 to the CD player 8. The infrared transmitting/receiving unit 21 also transmits an operation command for operating one of the STB 2 to the CD player 8 in the form of an infrared signal. The display panel 22 is a dot-matrix display for displaying a GUI, and a touch panel 23 is integrated with the display panel 22. The touch panel 23 is composed of a transparent member through which an image displayed on the display panel 22, which is lower, can be observed. The touch panel 23 detects a position touched by the user, as a pair of coordinates.

A switching button 24 is operated for switching on and off the power supply of the display panel 22. A jog dial 25 is used to perform frame-forwarding reproduction. Cursor keys 26-1 to 26-4 are used to move a cursor 43 for selecting one of selective items displayed on the display panel 22. A confirming button 27 is operated for confirming the selected item.

Figure 3:
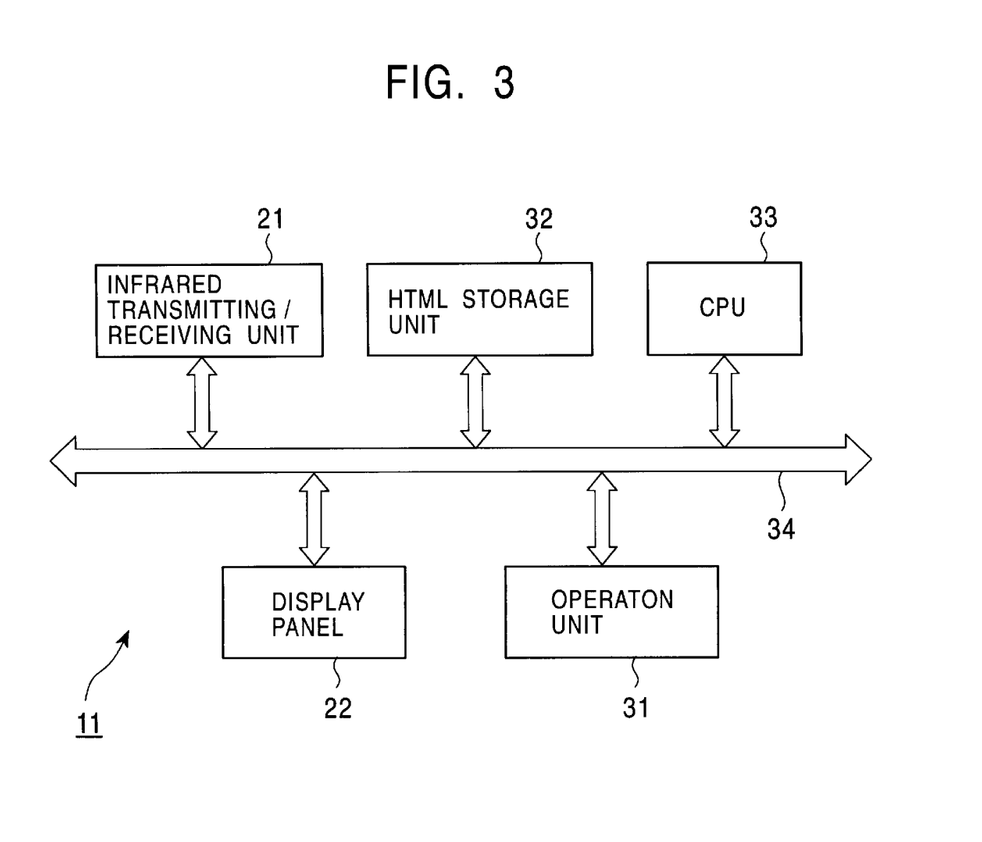
FIG. 3 is a block diagram showing the internal structure of the remote controller 11 shown in FIG. 1.

FIG. 3 shows an internal structure of the remote controller 11. An operation unit 31 detects operations by the user via the touch panel 23, the switching button 24, the jog dial 25, the cursor keys 26-1 to 26-4, and the confirming button 27, and outputs the operation information to a CPU 33. An HTML storage unit 32 is comprised of a memory, and stores HTML-form GUI data to be displayed on the display panel 22 and other types of display data. The HTML storage unit 32 also stores software required for displaying the HTML-form GUI data, such as an operating system and a browser. The CPU 33 controls the above-described units in accordance with the software. The above-described units are connected by a bus 34.

The HTML-form GUI data stored in the HTML storage unit 32 include data directly supplied from the electronic devices (the STB 2 to the CD player 8) and data supplied from the PC 9 to the remote controller 11 after being downloaded from the server on the Internet to the PC 9.

Figure 4:
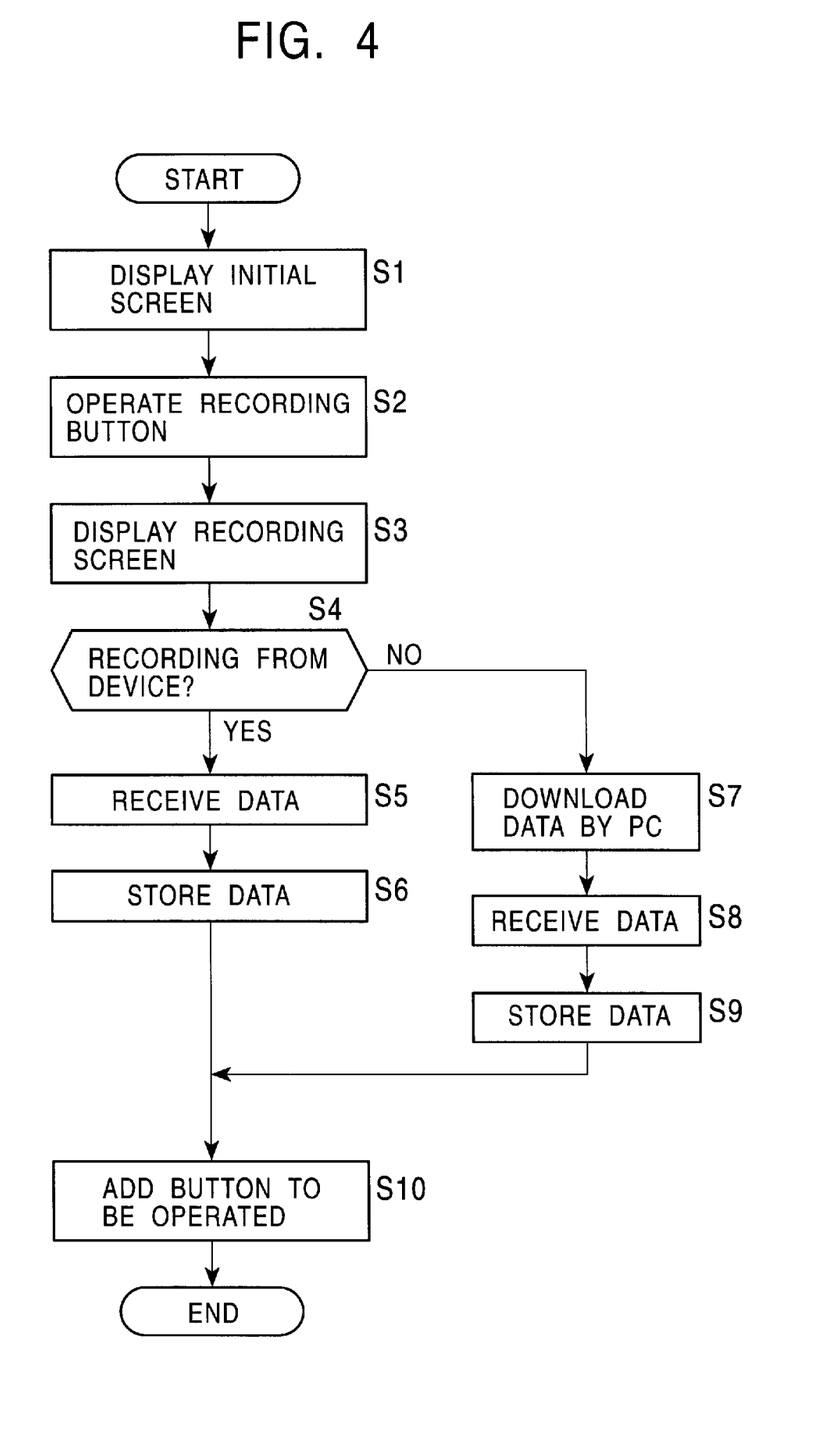
FIG. 4 is a flowchart illustrating a process for registering an added electronic device in the remote controller 11 shown in FIG. 1.

With reference to the flowchart shown in FIG. 4, the operation of the remote controller 11 is described below. In this description, the VCR 3, the DVD player 4, the amplifier 6, the MD player 7, and the CD player 8 have already been recorded in the remote controller 11, and the TV receiver 5 is additionally recorded.

Figure 5:
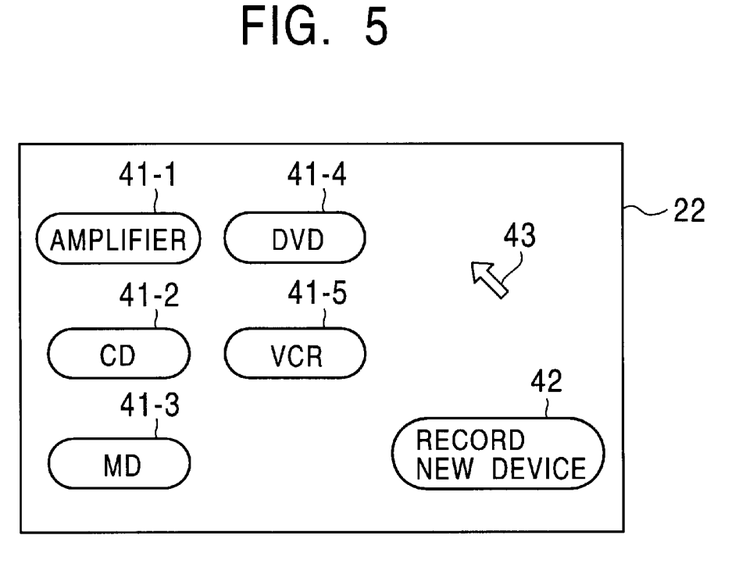
FIG. 5 is a drawing showing an example of an initial screen displayed on the display panel 22 shown in FIG. 2.

In step S1, when the switching button 24 of the remote controller 11 is operated by the user, the CPU 33 displays an initial screen read from the HTML storage unit 32. An example of the displayed initial screen is shown in FIG. 5. Each of the device operation buttons 41-1 to 41-5 is operated to select an electronic device to be controlled. Each displayed device operation button corresponds to one electronic device (recorded electronic device) whose HTML-form GUI data are stored in the HTML storage unit 32. In the example shown in FIG. 5, in accordance with the amplifier 6, the CD player 8, the MD player 7, the DVD player 4, and the VCR 3 that have already been recorded in the remote controller 11, the corresponding device operation buttons 41-1 to 41-5 are displayed.

A recording button 42 is operated to record information for a new electronic device in the remote controller 11.

Each button is selected by moving the cursor 43 with the cursor keys 26-1 to 26-4, and is confirmed by operating the confirming button 27. Also, each button is selected and confirmed by operating the jog dial 25 and the touch panel 23.

Figure 6:
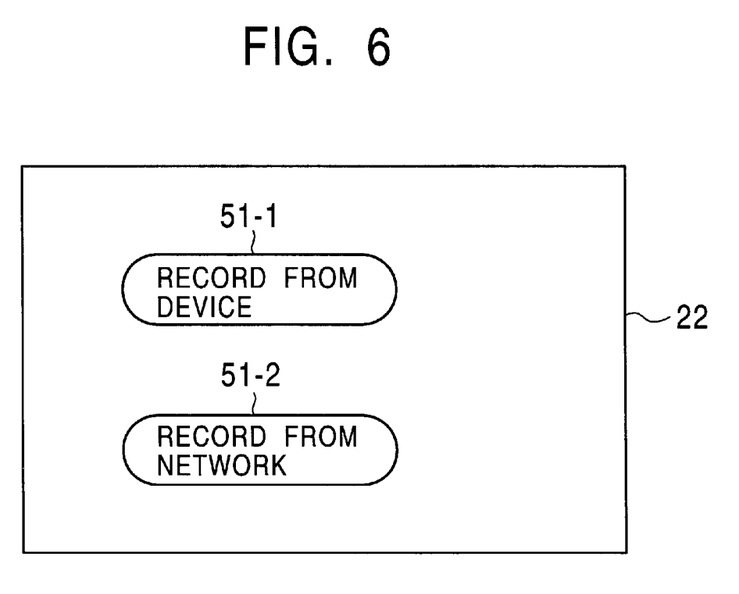
FIG. 6 is a drawing showing an example of a screen picture shown on the display panel 22 shown in FIG. 2.

When the recording button 42 is operated by the user in step S2, the CPU 33 proceeds to step S3, and the CPU 33 displays the recording screen shown in FIG. 6 on the display panel 22. On the display panel 22, the "RECORD FROM DEVICE" button 51-1 and the "RECORD FROM NETWORK" button 51-2 are displayed as command buttons. The "RECORD FROM DEVICE" button 51-1 is operated for reading HTML-form GUI data stored in an electronic device to be additionally recorded. The "RECORD FROM NETWORK" button 51-2 is operated for downloading GUI data from the server on the network by the PC 9 regardless of whether the electronic device to be additionally recorded stores HTML-form GUI data.

In step S4, the CPU 33 in the remote controller 11 determines whether the "RECORD FROM DEVICE" button 51-1 or the "RECORD FROM NETWORK" button 51-2 has been operated. The CPU 33 in the remote controller 11 waits for either button 51-1 or 51-2 to be operated. If the CPU 33 has determined that the "RECORD FROM DEVICE" button 51-1 has been operated, it proceeds to step S5. At this time, the user must operate either button 51-1 or 51-2 while aiming the infrared transmitting/receiving unit 21 of the remote controller 11 at the TV receiver 5 (the electronic device to be additionally recorded).

In step S5, the CPU 33 controls the infrared transmitting/receiving unit 21 to output a command for requesting HTML-form GUI data. When the TV receiver 5 receives the request command, it sends stored HTML-form GUI data by infrared transmission. The remote controller 11 uses the infrared transmitting/receiving unit 21 to receive the transmitted HTML-form GUI data.

In step S6, the HTML-form GUI data received as described above are stored in the HTML storage unit 32.

If the CPU 33 has determined in step S4 that the "RECORD FROM NETWORK" button 51-2 has been operated, it proceeds to step S7. In step S7, the CPU 33 controls the infrared transmitting/receiving unit 21 to output a command for requesting the IP address of the server at which the HTML-form GUI data are stored. When the TV receiver 5 receives the request command, it supplies the PC 9 with the stored IP address of the server.

The PC 9 accesses, via the network, the server corresponding to the IP address supplied from the TV receiver 5, and downloads the stored HTML-form GUI data. In step S8, the downloaded HTML-form GUI data are sent to the remote controller 11 by infrared transmission, and the transmitted HTML-form GUI data are received by the infrared transmitting/receiving unit 21. In step S9, the received HTML-form GUI data are stored in the HTML storage unit 32.

Figure 7:
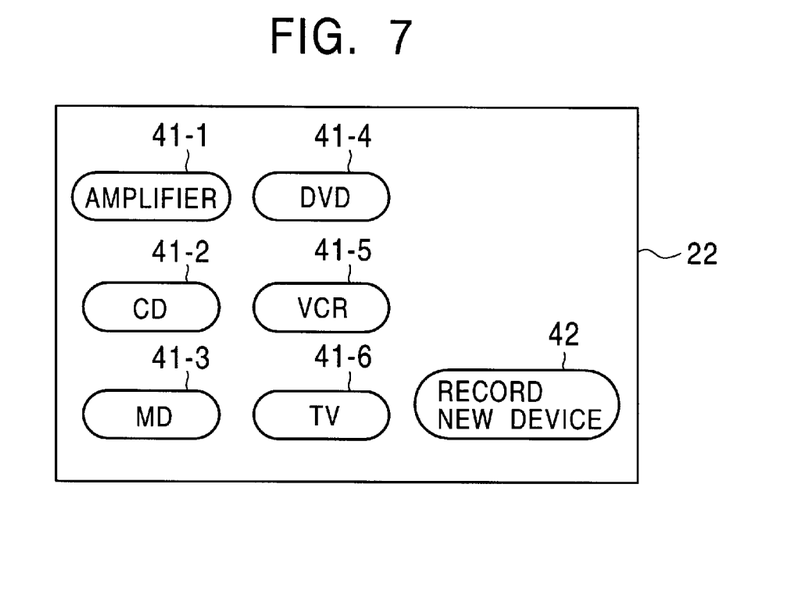
FIG. 7 is a drawing showing another example of the initial screen shown in FIG. 5.

After the received HTML-form GUI data of the TV receiver 5 are stored in the HTML storage unit 32, as described above, the CPU 33 proceeds to step S10, and a device operation button corresponding to the TV receiver 5 is added in the initial screen (displayed in step S1 and shown in FIG. 5). In other words, a command button 41-6, indicated as "TV", is additionally displayed as shown in FIG. 7.

If it is found in step S5 that the TV receiver 5 has no HTML-form GUI data of the TV receiver 5, the TV receiver 5 supplies the PC 9 with the IP address of the server at which the HTML-form GUI data of the TV receiver 5 are stored. Subsequently, processing from step S7 is similarly performed.

The HTML-form GUI data of the device (TV receiver 5) to be additionally recorded may be distributed to the user by using a storage medium such as a magnetic disk, and from the storage medium, the HTML-form GUI data may be provided to the remote controller 11.

Figure 8:
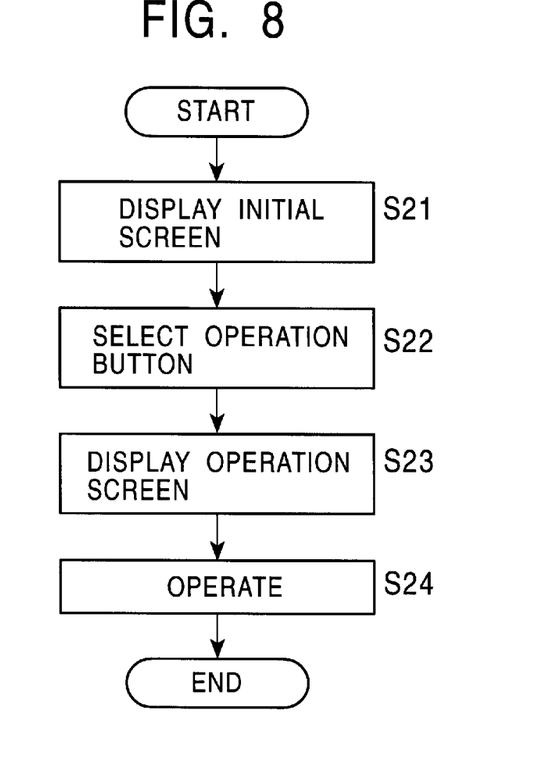
FIG. 8 is a flowchart illustrating a process for controlling an electronic device by using the remote controller 11 shown in FIG. 1.

With reference to the flowchart shown in FIG. 8, a process for controlling an electronic device by using the remote controller 11 is described below.

In step S21, an initial screen is displayed on the display panel 22. In this process, the initial screen shown in FIG. 7 is displayed on the display panel 22.

In step S22, among the device operation buttons 41-1 to 41-6, one device operation button is selected and confirmed by the user. For example, when the device operation button 41-6 is selected and operated, a GUI for controlling the TV receiver 5 is displayed on the display panel 22 in step S23. In other words, if the CPU 33 has determined that the device operation button 41-6 has been operated, it reads the HTML-form GUI data of the TV receiver 5 stored in the HTML storage unit 32, and displays the read data on the display panel 22. An example of the GUI corresponding to the TV receiver 5 is shown in FIG. 9.

Figure 9:
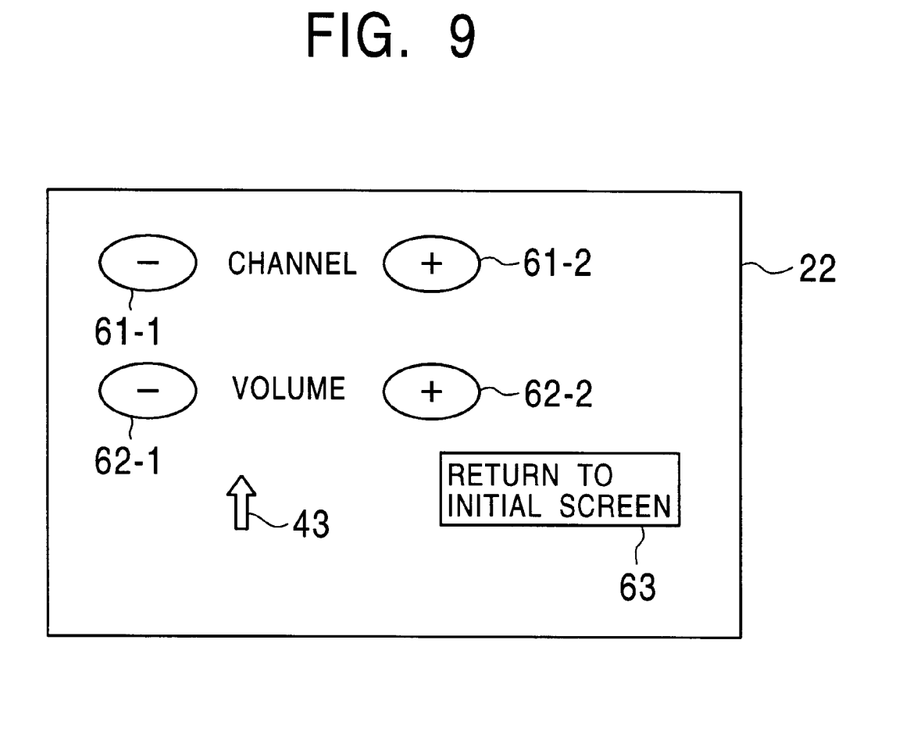
FIG. 9 is a drawing showing an example of a control screen displayed when the TV receiver shown in FIG. 1 is controlled.

In the example shown in FIG. 9, a minus button 61-1 and a plus button 61-2 are operated for changing channels. A minus button 62-1 and a plus button 62-2 are operated for changing the volume. A command button 63 is operated for returning to the initial screen (shown in FIG. 7).

After the GUI is displayed on the display panel 22, a user operation is accepted. For example, when the minus button 62-1 is operated, the operation is detected by the operation unit 31, and the detection signal is output to the CPU 33. The CPU 33 reads a command code (included in the GUI data) corresponding to the minus button 62-1 from the HTML storage unit 32, and uses the infrared transmitting/receiving unit 21 to transmit the read code. The TV receiver 5 reduces the volume in response to the transmitted code.

Figure 10:
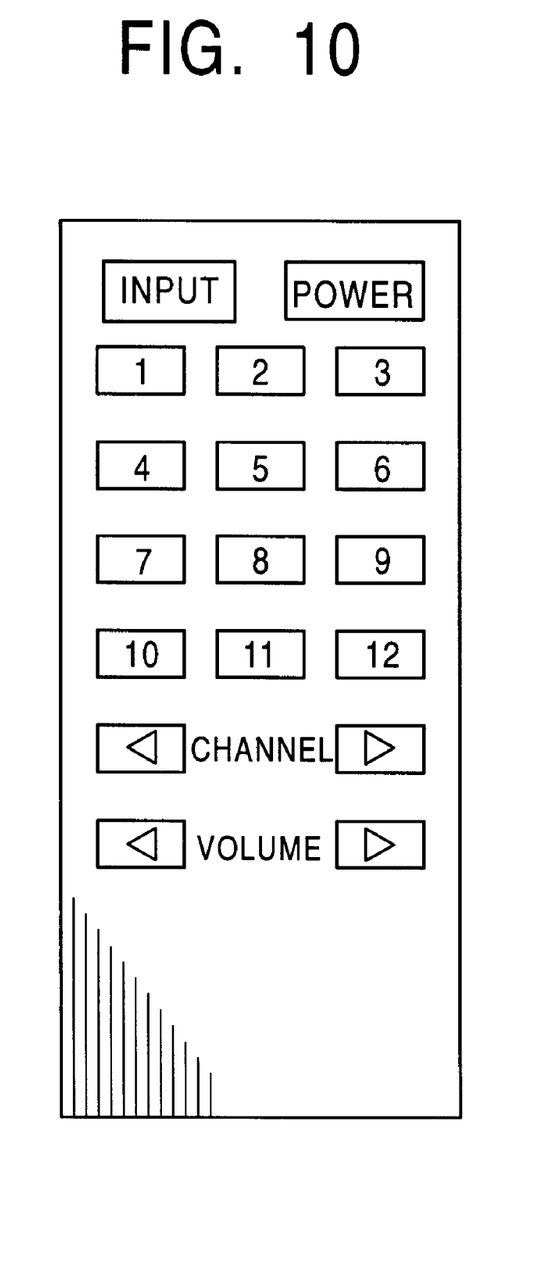
FIG. 10 is a drawing showing the shapes and arrangement of operation buttons of a remote controller dedicated to a TV receiver.
Figure 11:
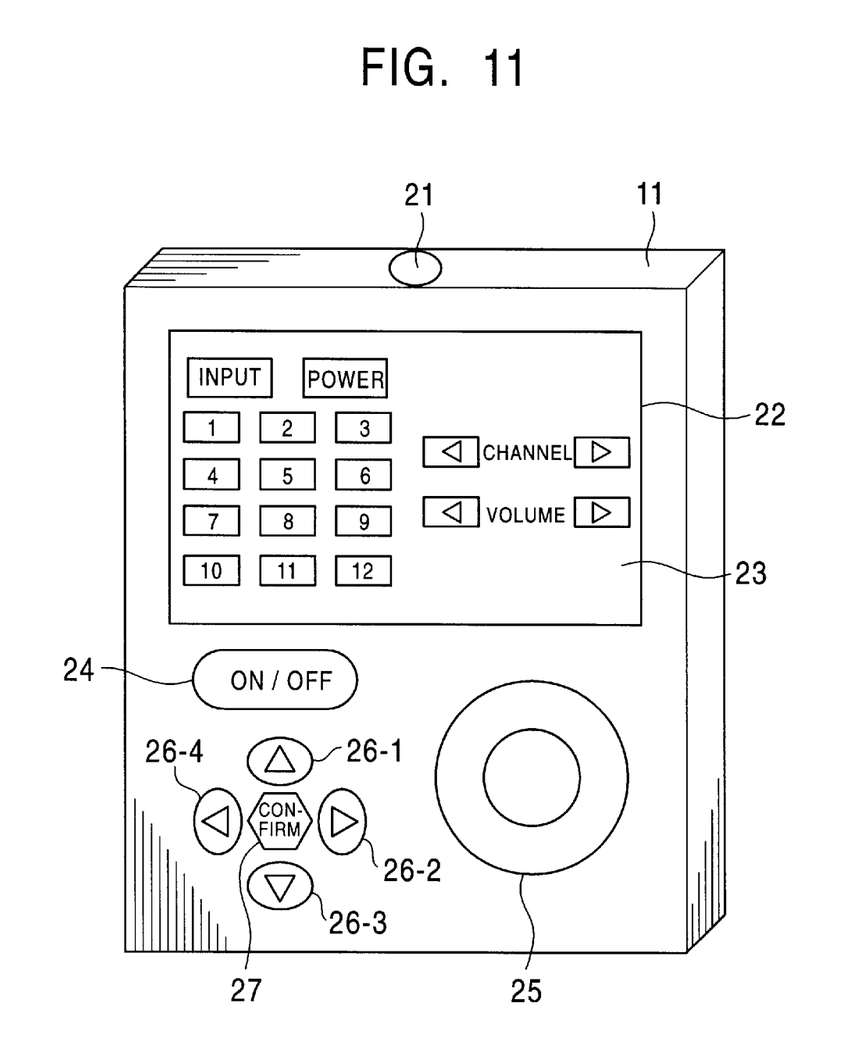
FIG. 11 is a drawing showing an example of a GUI displayed on the display panel 22.

By designing GUI symbols (operation buttons) to be similar to the shapes and arrangement (shown in, e.g., FIG. 10) of operation buttons of a remote controller dedicated to the TV receiver 5, that is, as in the example shown in FIG. 11, no confusion occurs in user operations. In addition, the GUI may be designed to be similar to the shapes of operation buttons provided in an electronic device itself.

In addition, only by preparing and storing, in the remote controller 11, HTML-form GUI data including command codes for an electronic device, an electronic device capable of being controlled by the remote controller 11 can be added without addition and modifications in hardware.

By describing GUI data in the HTML, an electronic device can be controlled by using a device (e.g., personal computer) capable of treating HTML-form data, in other words, the electronic device can be remote-controlled.

A computer program for performing the foregoing processing may be provided to the user not only on an information recording medium such as a magnetic disk or a compact-disk read-only memory but also by a network provision medium such as the Internet or digital satellite link.

What is claimed is:

1. An information processing unit for controlling a plurality of electronic devices, comprising:
    storage means for storing input graphical-user-interface data on the electronic devices;
    display means for displaying graphical user interfaces corresponding to the graphical-user-interface data stored in said storage means;
    detecting means for detecting user operations corresponding to the graphical user interfaces displayed on said display means; and
    transmitting means for transmitting control signals controlling the electronic devices in accordance with the results of detection by said detecting means,
    whereby said storage means, said display means, said detecting means, and said transmitting means are arranged in a single housing which is remote from any of the plurality of electronic devices.

2. An information processing unit according to claim 1, wherein the graphical-user-interface data are described in the form of hypertext markup language.

3. An information processing unit according to claim 1, wherein the shapes and arrangement of symbols on each graphical user interface are similar to those of operation buttons of a remote controller dedicated to the corresponding electronic device.

4. A remote controller for controlling a plurality of electronic devices, comprising:
    a storage unit for storing externally input graphical-user-interface data on the electronic devices, the graphical-user-interface data being described in the form of hypertext markup language;
    a display for displaying graphical user interfaces corresponding to the graphical-user-interface data stored in said storage unit;
    a detector for detecting user operations corresponding to the graphical-user-interface data displayed on said display; and
    a transmitter for transmitting control signals controlling each electronic device in response to the result of detection by said detector,
    whereby said storage unit, said display, said detector, and said transmitter are arranged in a single housing which is remote from any of the plurality of electronic devices.

5. A remote controller according to claim 4, wherein the graphical-user-interface data include command codes for controlling the electronic devices, and the command codes correspond to control buttons displayed as the graphical user interfaces, and wherein command data are read from said storage unit by operating each control button so that each electronic device is controlled.

6. A remote controller according to claim 4, wherein the graphical-user-interface data are stored in the electronic devices, and the graphical-user-interface data are supplied from the electronic devices to said storage unit.

7. A remote controller according to claim 4, wherein the electronic devices store addresses at which the graphical-user-interface data are stored, and the graphical-user-interface data are supplied from an information processing unit corresponding to each address to said storage unit.

8. A remote controller according to claim 4, wherein the graphical-user-interface data are stored in a storage medium provided separately from the electronic devices, and the graphical-user-interface data are supplied from said storage medium to the storage unit.

9. An information processing method for controlling a plurality of electronic devices, comprising:
    a storage step for storing input graphical-user-interface data on the electronic devices in a storage unit;
    a display step for displaying graphical user interfaces corresponding to the graphical-user-interface data stored in the storage step on a display unit;
    a detection step for detecting user operations corresponding to the graphical user interfaces displayed in the display step by use of a detector; and
    a transmission step for transmitting control signals controlling the electronic devices in accordance with the results of detection performed in the detection step by use of a transmitter,
    whereby said storage unit, display unit, detector and transmitter are arranged in a single housing which is remote from any of the plurality of electronic devices.

10. An information processing method according to claim 9, further comprising:
    a selection step for selecting one electronic device for supplying the graphical-user-interface data; and
    a record step for instructing the transmission of the graphical-user-interface data from the selected electronic device.

11. An information processing method according to claim 10, wherein when it is found that the graphical-user-interface data are not stored in the selected electronic device, the graphical-user-interface data are downloaded based on the address of a graphical-user-interface-data storage server which is stored in the selected electronic device.

12. An information processing method according to claim 9, further comprising:

a selection step for selecting one electronic device for supplying the graphical-user-interface data; and a download step for downloading the graphical-user-interface-data, based on the address of a graphical-user-interface-data storage server at which the graphical-user-interface-data are stored, the address of the graphical-user-interface-data storage server being output from the selected electronic device.

13. A provision medium for providing a computer-readable program to an information processing unit for controlling a plurality of electronic devices, said computer-readable program controlling said information processing unit to execute a process including:

a storage step for storing input graphical-user-interface data on the electronic devices in a storage unit;

a display step for displaying graphical user interfaces corresponding to the graphical-user-interface data stored in the storage step on a display unit;

a detection step for detecting user operations corresponding to the graphical user interfaces displayed in the display step by use of a detector; and a transmission step for transmitting control signals controlling the electronic devices in accordance with the results of detection performed in the detection step by use of a transmitter, whereby said storage unit, display unit, detector and transmitter are arranged in a single housing which is remote from any of the plurality of electronic devices.

14. A method for controlling an electronic device by an information processing unit, in which when said electronic device receives from said information processing unit a request for transmitting graphical-user-interface data for display on a display unit, and the graphical-user-interface data are stored in said electronic device or a storage medium belonging thereto, said method controls said electronic device to transmit the graphical-user-interface data to said information processing unit; and when the graphical-user-interface data are not stored in said electronic device or the storage medium, said method controls said electronic device to output an address stored in said electronic device, which represents a server storing the graphical-user-interface data, and said method controls said electronic device to download, from the server corresponding to the address via a network, and to supply the graphical-user-interface data to said information processing unit, whereby said information processing unit is arranged within a single housing which includes the display unit and which is remote from the electronic device.

15. An electronic device control method according to claim 14, wherein the graphical-user-interface data are described in the form of hypertext markup language, and the address is an Internet protocol address.

* * * * *